United States Patent
Cheron

[11] 3,775,186
[45] Nov. 27, 1973

[54] FUEL CELL
[75] Inventor: Jacques Cheron, Versailles, France
[73] Assignee: Institut Francais du Petrole, des Carburants et Lubrifiants, Ruell-Malmaison, France
[22] Filed: Apr. 5, 1971
[21] Appl. No.: 131,147

[30] Foreign Application Priority Data
Apr. 16, 1970 France............................... 7013729

[52] U.S. Cl............................................... 136/86 R
[51] Int. Cl. .......................................... H01m 27/12
[58] Field of Search..................................... 136/86

[56] References Cited
UNITED STATES PATENTS
2,635,431  4/1953  Bichowsky ...................... 136/86 E
2,980,749  4/1961  Broers.............................. 136/86 R
3,256,163  6/1966  Winsel et al. ..................... 136/86 C
3,511,712  5/1970  Giner................................ 136/86 R Primary Examiner—A. B. Curtis
Assistant Examiner—H. A. Freeley
Attorney—Craig, Antonelli & Hill

[57] ABSTRACT

A fuel cell apparatus comprising a cell block and a oxygen-containing gas purifier placed by the side of cell block, a fuel recirculation circuit, an electrolyte recirculation circuit, a static device for oxygen-containing gas draft, fed through a fuel leakage circuit and a heat exchanger exchanging heat between the hot electrolyte issuing from the cell block and the cold oxygen-containing gas purifying liquid issuing from the oxygen-containing gas purifier, thereby causing the respective motions of the electrolyte and the purifying liquid by double thermosiphon effect.

11 Claims, 6 Drawing Figures

FUEL CELL

This invention relates to a fuel cell which does not require any power for energizing auxiliary devices having a rotary or linear motion such as pumps, suction devices, blowers and the like.

The fuel cells known in the art are in fact provided with air-blowers, circulating pumps or controlled regulating devices. All of these auxiliary devices are generally actuated by electrical motors energized by a fraction of the power generated by the fuel cell.

Consequently, there results a decrease of the overall efficiency of the cell, a more complex design thereof resulting in a decrease of its reliability due to the frequency of the repairs. Moreover the maintenance of these cells is very costly.

It has been previously proposed to obviate these drawbacks by providing a fuel cell which does not need any auxiliary device driven in rotation or having a linear movement, due to a new arrangement of the cell constituting elements. This type of cell comprises a hot part formed by the cell block placed vertically above the cold part formed by the comburent purifier (oxygen-containing gas purifier), said two parts being connected through a duct for the conveyance of the purified comburent (oxygen-containing gas) by natural convection towards the hot part.

This arrangement suffers however from the disadvantage of being bulky in the vertical direction and that of requiring a number of static auxiliary devices.

It is therefore an object of this invention to avoid these disadvantages by providing a fuel cell of small bulkiness in the vertical direction and requiring only a minimum of static auxiliary devices.

This object is achieved according to the invention by realizing a fuel cell comprising a circuit for recirculating the fuel and a circuit for recirculating the electrolyte, in which the flows of said fuel and said electrolyte are produced by purely static means, not requiring any device driven in rotation or having a linear movement, due to the use of a static device for the draft of the comburent, fed with a leakage circuit of the fuel, by means of a lateral positioning of the hot part formed by the cell block, side by side with the cold part formed by the comburent purifier, in combination with the use of a heat exchanger in which the hot electrolyte issuing from the cell block circulates counter-currently with respect to the purifying liquid cooled by the comburent, which causes the movements of said electrolyte and said purifying liquid as a result of a double thermosiphon effect.

Other objects and advantages of this invention will be made apparent from the following description giving, with reference to the accompanying drawings, an illustration of several non-limitative embodiments of the invention. In a particular embodiment the comburent is the ambient air and the fuel is hydrogen.

Figure 1:
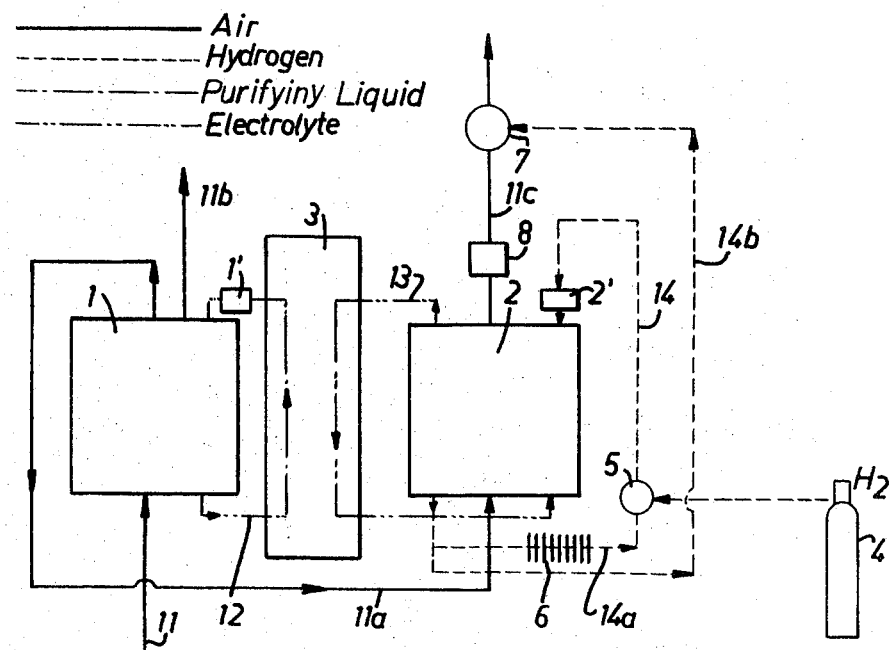
FIG. 1 is an overall diagrammatic view of the whole fuel cell.

In FIG. 1 reference 1 indicates an air purifier placed at the same level as that of a cell block 2.

The purifier is fed, through its lower part, with ambient air, conveyed through duct 11. A portion of said air is purified and supplied to block 2 through duct 11a. The purification is carried out by chemical absorption, i.e. by natural diffusion of the $CO_2$ contained in the air, in a convenient purifying liquid, not regenerable, such as potassium hydroxide, or regenerable, such, for example, as mono- or diethanolamine. When using potassium hydroxide the purification is achieved according to the reaction:

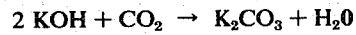

$$2\ KOH + CO_2 \rightarrow K_2CO_3 + H_2O$$

The purifier acting by removing carbon dioxide from the air is therefore a decarbonator. The most recent purifying apparatuses have an excellent absorption rate which may exceed 95 percent, with a minimum pressure loss for the air.

The purifying liquid circulates in the direction of the arrows of a circuit 12; it passes through the purifier in counter-current of the ascending air by which it is cooled and passes upwardly through a heat exchanger 3.

Figure 3:
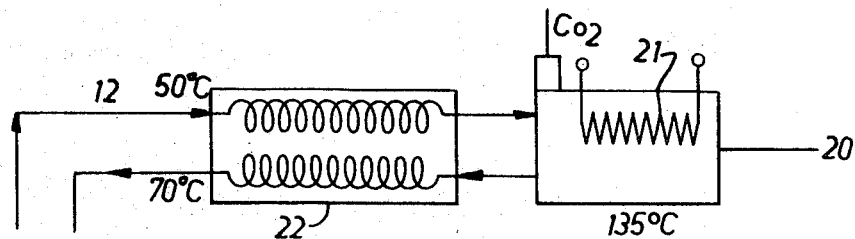
FIG. 3 is a diagrammatic view of a regenerator by heat of the purifying liquid.

Before being supplied at the top of the purifier, the purifying liquid, when regenerable, passes through a regenerator 1'. The regeneration is achieved by heating up to about 135°C, the regenerator (FIG. 3) comprising a closed chamber 20, traversed by the purifying liquid, and a heat source.

This heat source may be a heating resistor 21 connected to the terminals of the cell or a flame or catalytic burner, fed with a small portion of the hydrogen. The regenerator is advantageously associated to a heat exchanger 22.

The cell block 2 of a known type does not require a detailed description. In this block the passage sections of the different fluids, fuel (hydrogen), cumburent (purified air) and electrolyte (a basic product such as, for example, KOH), are determined so that the pressure losses be minimized.

The water excess is removed from the electrolyte so as to maintain constant its KOH content, for example. The stirring of the electrolyte (circuit 13) results from the circulation thereof in counter-current of the purifying liquid (circuit 12) inside the heat exchanger 3, said circulation being energized by the power generated by thermosiphon effect.

Inside the isolated enclosure of exchanger 3, the thermosiphon effect results from the temperature difference between a hot source, the heat of which results from a heat exchange with the electrolyte (circuit 13) of the cell block 2, and a cold source due to the cooling by the ambient air, at least partly purified, of the purifying liquid (circuit 12).

The thermal power generated by the electrochemical reactions in the cell block are thus directly converted to mechanical power without decrease in the battery output, said power being used both for circulating the electrolyte through circuit 13 and for circulating the purifying liquid through circuit 12.

Figure 4:
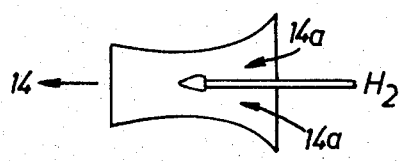
FIG. 4 is a diagrammatic view of a Venturi for hydrogen supply.

The hydrogen of convenient purity is supplied from a pressurized hydrogen cylinder 4 and conveyed through a nozzle to the choke of a Venturi 5 (FIG. 4).

The divergent section of the Venturi is connected to a duct 14 conveying the hydrogen to the top of the cell block 2, while the convergent section is connected to a duct 14a, gathering the unreacted hydrogen. In the circuit of said duct 14a is placed a condenser 6 for removing the steam accompanying the hydrogen excess.

Figure 5:
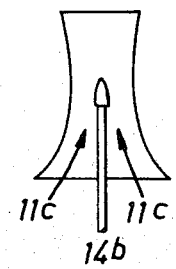
FIG. 5 is a diagrammatic view of an air draft Venturi.
Figure 6:
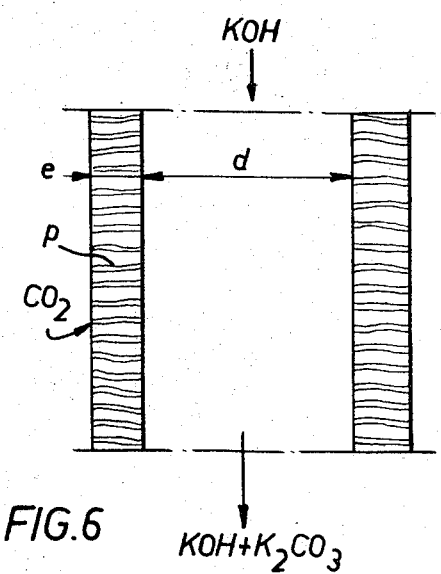
FIG. 6 is a diagrammatic view of a hydrophobic porous tube.

The suction effect of the Venturi acts on the duct 14a and on the branched duct 14b forming the so-called leakage circuit. The purpose of this leakage circuit is to maintain constant the impurities content of the hydrogen and to feed a device 7 for the draft of the comburent air. This device 7 may consist of a simple burner fed with the hydrogen through the leakage circuit 14b and with the air excess available at the output of the cell block 2, through duct 11c, said burner being optionally surmounted with a stack and a draft accelerator. This device 7 may also consist of a Venturi (FIG. 5) the throttle of which is fed from the same leakage circuit 14b and the convergent section of which is connected to the duct 11c for discharging the excess of air and steam.

In the circuit of duct 11c is provided a regulator 8 of the check valve type in order to insure a bumpless operation of device 7, when the same consists of a burner.

It is advantageous to reduce in the block 2 the sections of the chambers for the hydrogen circulation without producing substantial pressure losses.

In order to avoid any unbalance in the feeding of the various chambers it is preferred to feed each chamber with hydrogen through capillary tubes placed above each chamber, for example in a distributor 2'. These capillary tubes must insure the passage of the fuel without being liable to any obstruction by a drop of liquid.

This distributor is particularly convenient when the hydrogen electrodes are very thin and cannot withstand high pressures.

The above described thermosiphon cannot work but when the circuit of the liquid purifier absorbing the carbon dioxide is tight. For this purpose there is used a tube or plate bundle of hydrophobic porous material such, for example as "Teflon", polytetrafluoroethylene, so treated as to become porous, which retains the liquid while giving passage to $CO_2$ towards the liquid. The porous walls have a thickness of about 0.1 mm and the internal diameter of the tubes is from 100 to 200 times this thickness.

Figure 2:
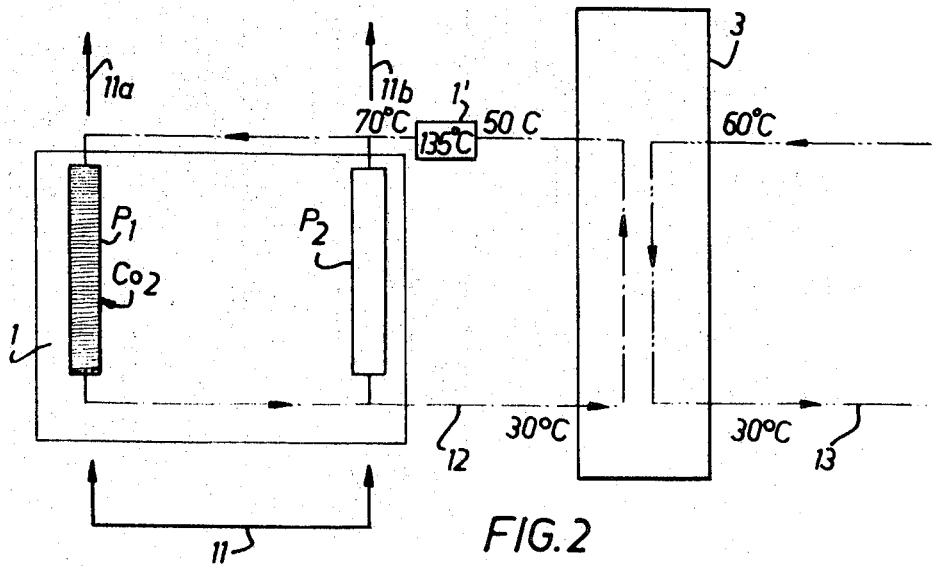
FIG. 2 is a partial diagrammatic view showing the purifier, the heat exchanger and the associated circuits, particularly the double air circuit.

If the heat dissipation, necessary for the thermal regulation of the block, requires a substantial air stream, an excessive carbonation of the purifier is avoided by providing in parallel with the hydrophobic porous tubes or plates $P_1$, (FIG. 2), forming a second compartment of the purifier, other non porous tubes or plates $P_2$ forming a second compartment of the purifier for the purpose of increasing the heat exchange surface. In these conditions the purified air (duct 11a) for feeding the cell block 2 must be separated from the non-purified air (exhaust duct 11b).

From the foregoing description of a non-limitative embodiment of the invention, one skilled in the art can easily ascertain the essential characteristics thereof and, without departing from the spirit and scope thereof, can make various changes and modifications of the invention to adapt it to various usages and conditions. Consequently such changes and modifications are properly, equitably and intended to be within the full range of equivalence of the appended claims.

What I claim as my invention is :

1. A fuel cell apparatus comprising in combination; an oxygen-containing gas purifier, heat exchange means and a fuel cell block, said oxygen-containing gas purifier forming a cold part of the fuel cell apparatus and containing liquid means for purifying an oxygen-containing gas, inlet and outlet means for at least one oxygen-containing gas and the purifying liquid at opposite sides of the oxygen-containing gas purifier; said heat exchange means being in operative association with the purifying liquid and an electrolyte and provided with inlet and outlet means for the electrolyte and purifying liquid; said fuel cell block forming a hot part of the fuel cell apparatus and having inlet and outlet means for introducing and discharging at least one oxygen-containing gas, one fuel and one electrolyte, said fuel being supplied from a pressurized source, oxygen-containing gas draft means in operative association with said oxygen-containing gas outlet means of said fuel cell block, means for conveying the fuel, electrolyte, and oxygen-containing gas between the oxygen-containing gas purifier, heat exchanger, and fuel cell block; characterized in that the oxygen-containing gas is purified and preheated by the purifying liquid circulating through the oxygen-containing gas purifier countercurrent to the oxygen-containing gas, said purified oxygen-containing gas being conveyed from said oxygen-containing gas purifier to the fuel cell block by said conveying means and exiting from the fuel cell block through said outlet means, said oxygen-containing gas draft means connected to the oxygen-containing gas outlet means by conveying means, said oxygen-containing gas draft means comprising a static device ensuring the circulation of the oxygen-containing gas, said static device being fed through a fuel leakage circuit comprising means for conveying unreacted fuel being discharged from the fuel cell block to said static device, said purifying liquid being conveyed to and from the heat exchanger by said conveying means to form a tight purifying liquid recirculating circuit, said electrolyte also being conveyed to and from said heat exchanger by said conveying means to form an electrolyte recirculating circuit so that said purifying liquid and electrolyte are flowing countercurrent to each other in the heat exchanger, said countercurrent circulation of the electrolyte and purifying liquid being solely caused by a thermosiphon effect resulting from the temperature difference between the electrolyte entering the heat exchanger from the fuel cell block and the purifying liquid entering the heat exchanger from the oxygen-containing gas purifier, said purifying liquid having been cooled by said oxygen-containing gas; said heat exchanger, cell block and oxygen-containing gas purifier being placed side-by-side and substantially at the same level to thereby ensure the conveyance of the oxygen-containing gas, the purifying liquid, the fuel and the electrolyte without requiring the need of any rotary or linear device.

2. A fuel cell apparatus according to claim 1, wherein the purifier includes two separate compartments in which the purifying liquid flows, comprising a first compartment in which air used as the oxygen-containing gas feeding the cell is purified, and a second compartment for enhancing the cooling of the purifying liquid by means of an additional air stream not used for feeding the fuel cell.

3. A fuel cell apparatus according to claim 1, wherein the liquid for purifying the air used as a oxygen-containing gas can be regenerated and its circulation circuit includes a regenerator.

4. A fuel cell apparatus according to claim 3 wherein the oxygen-containing gas purification is essentially a decarbonatation and wherein the regenerable purifying liquid is mono- or di-ethanolamine.

5. A fuel cell apparatus according to claim 4, wherein the regenerator includes a closed chamber and a heating resistor connected to the cell terminals.

6. A fuel cell apparatus according to claim 4, wherein the regenerator includes a chamber heated by a flame or a catalytic burner, fed with the cell fuel.

7. A fuel cell apparatus according to claim 1, wherein the draft static device is a burner equipped with a stack and a draft accelerator.

8. A fuel cell apparatus according to claim 1 wherein the draft static device is a Venturi actuated by the fuel leakage circuit.

9. A fuel cell apparatus according to claim 1 wherein the purifier comprises a tube or plate bundle of hydrophobic porous material retaining the purifying liquid but giving passage to the $CO_2$ of the oxygen-containing gas towards the liquid.

10. A fuel cell apparatus according to claim 9 wherein the hydrophobic porous material is polytetrafluoroethylene.

11. A fuel cell apparatus according to claim 2 comprising both hydrophobic porous tubes or plates for the first purifying and cooling oxygen-containing gas of the air used as comburent, and non porous tubes or plates for the second compartment used for the only purpose of cooling the purifying liquid.

* * * * *